Oct. 13, 1942.   C. F. LEATHERS   2,298,570
ELECTRIC TIMER
Filed June 23, 1939   3 Sheets-Sheet 1

Fig 1

Inventor
Chester F. Leathers
By Faust F. Crampton
Attorney

Fig 2

Oct. 13, 1942.  C. F. LEATHERS  2,298,570
ELECTRIC TIMER
Filed June 23, 1939   3 Sheets-Sheet 3

Fig 3

Inventor
Chester F. Leathers
By
Attorney

Patented Oct. 13, 1942

2,298,570

UNITED STATES PATENT OFFICE 2,298,570

ELECTRIC TIMER

Chester F. Leathers, Chillicothe, Ohio, assignor to Weltronic Corporation, Detroit, Mich., a corporation of Michigan Application June 23, 1939, Serial No. 280,803

12 Claims. (Cl. 175—320)

My invention relates to an electric timer that may be used for the purpose of controlling time periods of operation of apparatus, machines, and devices of different forms to cause sequential periods or steps of operations that are of like or dissimilar character, or to produce intermissions of predetermined length between operations of the apparatus. The invention is, particularly, advantageously applicable to welder apparatus, whereby the more important sequential operations of either a manually-operated spot welder or a machine spot welder may be caused to perform their functions in desired sequence and, also, for desired periods, or, may be limited, for certain sequential operations, to periods of desired lengths, or the periods of like or different character may be separated by desired periods.

The invention, particularly, consists in the provision of one or more condensers, each of which controls a particular function that is performed by the apparatus or device, to limit such performance to a desired period and, where more than one condenser is used, the condensers are interconnected by condenser-controlled elements to produce the proper sequence of control and, thus, cause the time operations, as well as predetermined periods of operations, of the parts of the apparatus or device that coact to produce the final desired results that the apparatus or device is intended to perform. The condenser or the condensers are charged by a source of direct current and they are interconnected to produce the required sequential discharge, which, through their connection with parts of the apparatus or devices, causes initiation and performance of the parts in their sequential and timed relation and within predetermined periods.

The invention consists in other features which will appear from the following description and upon examination of the drawings. The invention may be contained in apparatus and systems of different forms and, to illustrate a practical application of the invention, I have selected, as an example of the embodiments of the invention, three timer-controlling systems, each of which is connected to a spot welder apparatus or system to cause the desired sequential operations and intermissions between operations of parts, in order to produce desired results in such apparatus, and shall describe the timer systems, as thus applied, hereinafter, it being understood that variations may be made in the systems and parts thereof and, also, that certain features of the invention may be used without the use of other features of the invention and without departing from the spirit of the claims as hereinafter appended. The particular timer systems containing my invention are described hereinafter and diagrammatically shown in the drawings forming a part hereof.

Figure 1:
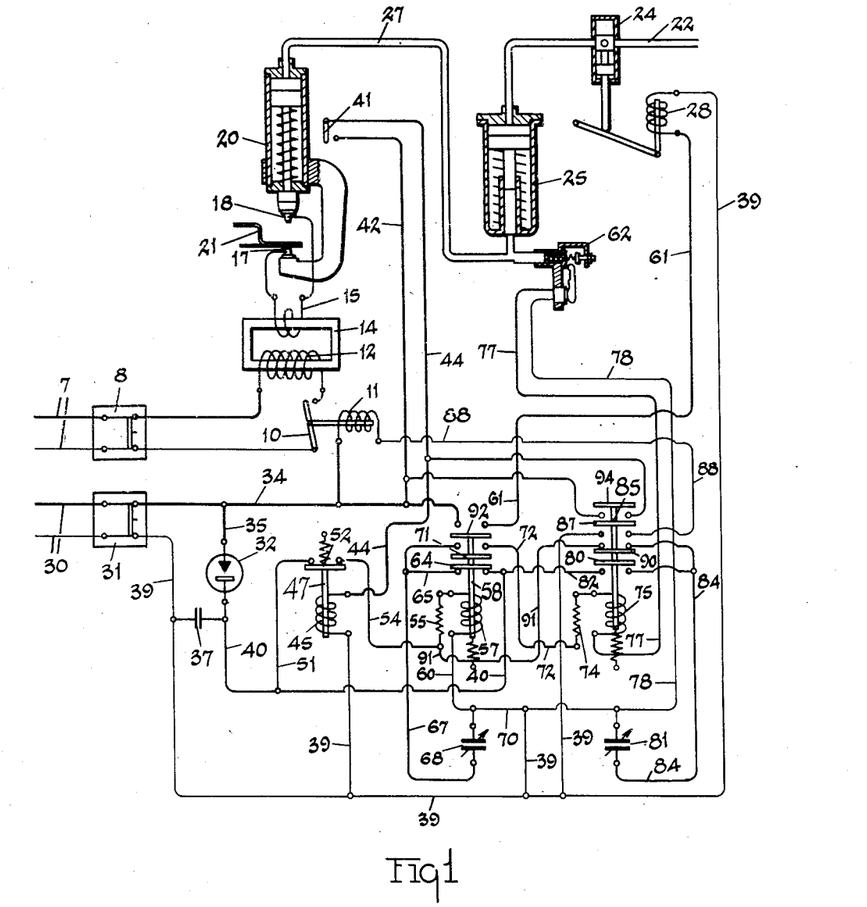
Fig. 1 illustrates, diagrammatically, a welding apparatus and a timer-controlling system for controlling the welder apparatus to cause the production of a welding pressure for a predetermined interval of time, and the flow of the welding current within the pressure period, the said pressure period followed by the cessation of the welder pressure for a predetermined interval of time.

In the form of apparatus and systems shown in Fig. 1, the welder apparatus is connected to a source of supply of electric current through the lines 7 by means of a suitable main line switch 8. The flow of the current, through the switch 8, is controlled by a contactor switch 10, which is actuated by a solenoid 11 to complete a circuit through the primary 12 of the transformer 14 to produce the flow of the welding current through the secondary 15. The secondary 15 is connected to the electrodes 17 and 18 of the spot welder 20, which is of the type manually manipulated to move the welder along the work as the welds are produced. The welder 20 is actuated to cause the electrodes 17 and 18 to engage opposite sides of the work 21, the pressure being producible by the pressure of a source of supply of pressure, which is transmitted through a suitable pipe 22 as controlled by a valve 24. If desired, a booster or other pressure-translating means may be located intermediate the valve 24 and the welder 20 to produce a desired high pressure to enable the production of a required welding pressure of the electrodes against the work by the use of a relatively small welder cylinder, or to produce any high pressure that may be required in order to produce the required welds between the parts of the work 21.

In the form of construction shown in Fig. 1, a pneumatic-hydraulic booster 25 is located intermediate the valve 24 and the welder 20, and the pressure produced by the booster is transmitted through a liquid, such as oil, located in the pipe 27 and the chambers and passages connected therewith. Air under pressure is, thus, transmitted through the pipe 22 to the booster 25, which magnifies the pressure, and the force produced is transmitted through the pipe 27 and to the welder 20. The valve 24 is electromagnetically operated by means of the solenoid 28 to cause the transmission of pressure to the welder and the solenoid 11, which, when operated, causes the flow of the welding current through the work. The energization of the solenoids 11 and 28 are controlled by the timer-controlling system.

The timer-controlling system is connected to a source of supply of current through the lines 30 by means of the switch 31. Assuming that the source of supply through the lines 30 is an alternating current, the current used for controlling the welder apparatus may be caused to flow through a rectifier 32, that is connected to one of the lines 30, through the lines 34 and 35. Preferably, a condenser 37 is connected across the lines 39 and 40 to produce a substantially constant flow of unidirectional current in the lines 39 and 40.

In order to initiate the cycles of operation of the welder apparatus, through the operation of the control system, the main line switches 8 and 31 are closed and the rectified current flows through the line 40, the line 51, the movable contact 52, the line 54, through the resistor 55, the solenoid 57 of the relay 58, the line 60, to the line 39, which maintains the solenoid 57 energized and its contacts down. When the operator has placed the welder 20 in position to produce a spot weld on the work, a switch 41 is manually closed. In machine welders wherein the work is usually moved relative to the welders, a switch may be automatically closed by the machine to initiate the operations that are initiated by the closure of the switch 41. The switch 41 is connected to the line 34, by the line 42, and, when operated, connects the line 34, through the lines 42 and 44, to the solenoid 45 of the relay 47, which is connected to the line 39. The solenoid 45 is an alternating-current solenoid and causes the relay 7 to open the circuit through the contact 52, which is controlled thereby. A circuit is also completed from the line 40, through the movable contact 64, through the line 66, the line 67, to the adjustable condenser 68, which is connected, through the line 78, to the line 39. When, therefore, the solenoid 45 of the relay 47 is energized by the closure of the switch 41 and its contacts moved down, the circuit from the line 40 to the solenoid 57, through the movable contact 52, is opened and the solenoid 57 of the relay 58 becomes de-energized and its contacts are raised. A circuit from the line 39 through the solenoid 28, is, thus, completed and the air valve 24 is operated by the flow of current through the line 61, and the movable contact 92 of the relay 58, to the line 34.

Upon the operation of the valve 24, by the solenoid 28, the booster 25 is operated, which converts the pneumatic pressure of the source of supply to a higher hydraulic pressure, which is transmitted through the pipe 27, to the welder 20, and, also, to a pressure switch, which is operated by the pressure that is produced in the pipes 27 and in the welder 20. The pressure switch 62 closes a circuit when the pressure in the welder rises to a predetermined point, depending upon the adjustment of the pressure switch. The electrodes 17 and 18 of the welder 20 are brought into engagement with the work 21 to complete the circuit of the secondary 15 through the electrodes and the work. When the pressure has reached the required predetermined point and the pressure switch 62 is closed, a circuit is completed from the condenser 68, which is connected to the line 70, and discharges through the line 67, the movable contact 71, which is now up, to the line 72, the resistor 74, the solenoid 75, through the line 77, to the pressure switch 62, the line 78, to the line 70, and, depending upon the adjusted capacity of the condenser 68, the current will continue to flow through the solenoid 75 of the relay 85 to energize the solenoid and move the contacts of the relay 85 down and close certain of the contacts. Upon closure of the movable contact 80, the circuit is completed from the condenser 81, from the line 40, through the line 82, the contact 80, to the line 84, the condenser 81, which is connected through the line 70, to the line 39, and the condenser 81 is charged.

Upon the operation of the relay 85, not only the condenser 81 is charged, but, also, the circuit from the line 39, through the movable contact 87, to the line 88, and the solenoid 11 of the connector switch 10 is completed to the line 34. The energization of the solenoid 11 operates the contactor switch 10 to close the primary 12 of the transformer 14 to cause the flow of the welding current through the secondary 15 and the electrodes 17 and 18 of the welder and the work 21.

The welding current flows for a period determined by the adjusted capacity of the condenser 68 and as determined by the resistor 74, which, if desired, may, also, be adjustable to vary the current quantity that may be discharged, per unit of time, by the condenser. Thus, the welding current flows through the electrodes from the time that the pressure in the welder has risen to a point to complete the operation of the pressure switch 62 and the current continues to flow until the dielectric current from the condenser 68 ceases to flow through the solenoid 75 of the relay 85. Upon the de-energization of the solenoid 75 of the relay 85, the circuit through the solenoid 11 of the contactor switch 10 is de-energized by the operation of the relay 85, which then raises its contact. The contactor switch 10 opens the circuit of the primary 12 of the transformer 14 and the welding current ceases to flow.

Also, upon de-energization of the solenoid 75 of the relay 85, the solenoid 57 is energized. The movable contact 90 of the relay 85 then closes the circuit from the charged condenser 81, which was charged when the solenoid 75 of the relay 85 was energized. The circuit, thus closed, is through the line 84, the movable contact 90, the line 91, the resistor 55, the solenoid 57, the line 60, the line 70, to the other side of the condenser 81, whereupon, the solenoid 57 is energized to open the circuit from the line 34, through the movable contact 92, to the solenoid 28, and the line 39. Thus, the valve 24 is operated to release the pressure in the welder 20, subsequent to the operation of the contactor switch 10, and the pistons of the welder and the booster return to their original positions.

In the meantime, the dielectric current from the condenser 81 continues to flow through the solenoid 57 of the relay 58 to prevent restoration of the relay 58 by the de-energization of the solenoid 57. This gives a limited time within which the welder may be shifted and placed in position for the production of the succeeding weld.

Upon the de-energization of the solenoid 57, the movable contact 92 again closes the circuit of the solenoid 28, which connects the line 34 with the line 61, to the solenoid 28, and the line 39, whereupon, the valve 24 is again operated to connect the booster 25 to the source of supply of fluid under pressure, and the booster 25 again produces a pressure in the pipe 27, which is connected to the welder 20, and the pressure rises to the predetermined welding pressure. This reestablishes the circuit from the condenser 66, through the line 67, the movable contact 71, the line 72, the resistor 74, the solenoid 75, the line 77, to the pressure switch 62, and to the line 78. This causes the relay 85 to reestablish the circuit of the contactor switch 10 and the welding current is again caused to flow through the electrodes.

Thus, the cycle of operation continues as long as the operator maintains the switch 41 closed. The cycle of operations may be discontinued at any time and for any purpose, such as for replacing the work.

To prevent interruptions of the welding current by the operation of the switch 41, in advance of the completion of the weld, the relay 85 is provided, not only with the movable contact 87 that completes the circuit of the solenoid 11 of the contactor switch 10, but, also, with a movable contact 94, which is closed at the same time the movable contact 87 is closed, and is located in a circuit paralleling that leading to and from the switch 41, in order to maintain the completion of the flow of the current through the solenoid 45 during the period of the flow of the welding current through the solenoid 11 of the contactor switch 10.

Figure 2:
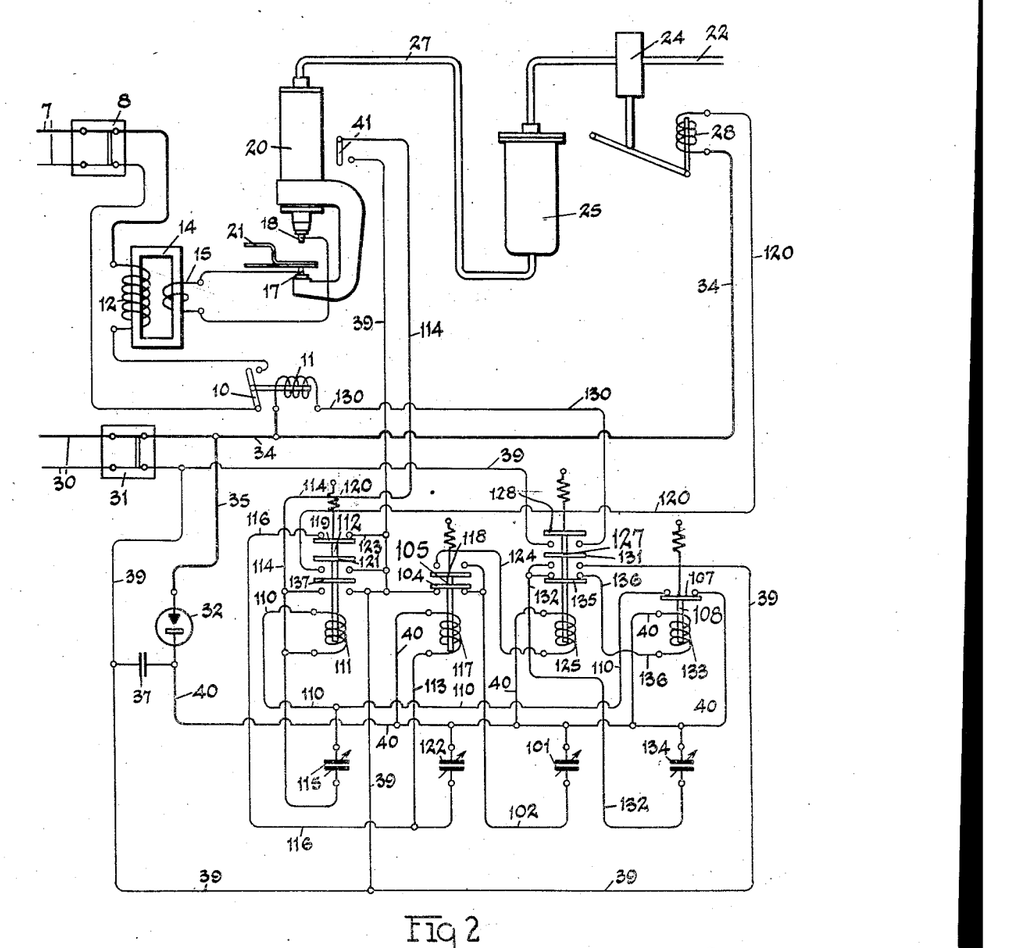
Fig. 2 illustrates, diagrammatically, a welder apparatus and a timer-controlling system for causing the production of a welding pressure for a predetermined interval of time and for causing the flow of welding current for a predetermined interval of time within the pressure period, the flow period being initiated at the expiration of a predetermined interval of time subsequent to the initiation of the pressure period, and the flow period terminating before the cessation of the pressure period for a predetermined interval of time, the pressure period followed by a predetermined interval of time, during which the work or the welder may be moved, one relative to the other.

In the form of control system illustrated in Fig. 2, the welder is caused to produce its maximum welding pressure, in advance of the initiation of the flow of the welding current, in order to, if necessary, reshape the portions of one or both parts of the metal in the region of the weld that is to be produced. This is of particular advantage where the surfaces do not make, at each of the points at which the weld is to be produced, a close contact, and the welder is given an opportunity to force the metal, at such points, together. This occurs where there is any buckling, irregular formation, or imperfections in the shaping of the metal. When the maximum pressure, producible by the apparatus, has been exerted, the welding current is caused to flow and flows for a predetermined interval of time. Also, in the form of controlling system shown in Fig. 2, provision is made for maintaining the pressure, following the formation of the weld, to retain the parts in position until the weld has cooled and hardened sufficient to hold the parts in contact with each other. This is of particular advantage where localized deformations occur in the line of the welds and the parts of the work have been forced into shape by the welder, and the metal has considerable elasticity which would cause separation of the parts unless held in contact with each other by the pressure of the welder.

Closure of the switch 8 completes the circuit of the welder apparatus to the main lines 7. When the switch 31 is closed, the circuit is established with a rectifier 32 and its associated condenser 37, to produce a rectified current in the circuit of the lines 39 and 40. Closure of the switch 31 causes charging of the adjustable condenser 101 by its connection to the line 40 and, also, its connection through the line 102, the movable contact 104 of the relay 105, to the line 39. The solenoid 117 of the relay 105 is energized, and the condenser 122 is charged by the connection of the solenoid and the relay with the line 40, through the lines 113 and 116, the movable contact 119 of the relay 112, the line 123, to the line 39.

To initiate the operation of the welder apparatus, the switch 41 is operated by the operator, to complete a circuit from the line 40, through the movable contact 107 of the relay 108, whose solenoid is de-energized, to the line 110, the solenoid 111 of the relay 112, to the line 114, the switch 41, to the line 39 and, also, from the line 110, to the condenser 115, which is, also, connected to the line 114. This causes the energization of the solenoid 111 of the relay 112 and, also, charges the adjustable condenser 115.

The operation of the relay 112, by the operation of the solenoid 111, causes the energization of the solenoid 28, and the valve 24 is operated. The solenoid 28 is connected to the line 34 and to the line 120, which is connected, through the movable contact 121 of the relay 112, to the line 39. The relay 112, also, operates its movable contact 119 to open the circuit of the line 39 to the condenser 122 and the solenoid 117 of the relay 105. The condenser 122 discharges through the solenoid 117 to maintain the solenoid 117 energized for a predetermined time, according to the adjusted capacity of the condenser 122. The period of the discharge of the condenser 122 affords opportunity for the welding pressure to rise, within the welder, to its maximum, and force the parts of the work together, if it should be so formed as to produce an imperfect contact, so that, when the welding current is caused to flow, a weld may be produced at the points of contact of the electrodes with the work.

When the dielectric current from the condenser 122 ceases to flow, the solenoid 117 of the relay 105 is de-energized to cause opening of the movable contact 104 and to close the contact 118. This connects the condenser 101, through the line 102, through the movable contact 118, the line 124, with the solenoid 125 of the relay 127, to the line 40, which is, also, connected to the condenser 101, and its dielectric current actuates the relay 127 to complete the circuit of the contactor switch 10, through the movable contact 128, which completes the circuit from the line 39, through the movable contact 128, the line 130, to the solenoid 11 of the contactor switch 10, and to the line 34. Thus, the current is caused to flow through the primary 12 of the transformer 14, which, in turn, causes the welding current to flow through the electrodes 17 and 18 and the work 21, upon the expiration of the flow of the dielectric current, from the condenser 122. Also, upon the operation of the relay 127, the movable contact 131 completes the circuit from the line 39, through the line 132, to the adjustable condenser 134, which is connected to the line 40 and, thus, causes the adjustable condenser 134 to be charged.

Upon the cessation of flow of the dielectric current from the condenser 101, the solenoid 125 of the relay 126 becomes de-energized, which operates to break the circuit through the movable contact 128 and the solenoid 11 of the contactor switch 10, and, at the same time, it breaks the connection of the condenser 134 with the line 39, through the movable contact 131 of the relay 127, whereby it has been charged, and connects the condenser 134 with the solenoid 133 of the relay 108, through the line 132, the movable contact 135, to the line 136, the condenser 134 and the solenoid 133 being both connected to the line 40. Thus, upon the cessation of the flow of the welding current, the solenoid 133 of the relay 108 is energized and through the movable contact 107, it opens the circuit from the line 40 and the line 110, to the condenser 115, and the solenoid 111 of the relay 112, which is connected to the line 39, through the contact 137 of the relay 112. The condenser 115 will now cause the dielectric current to flow through the solenoid 111 of the relay 112 until the condenser 115 is discharged. Thus, the solenoid 28 is maintained energized and the valve 24 open to connect the source of supply of air under pressure to the welder apparatus, which maintains a pressure in the welder, subsequent to the cessation of the flow of the welding current, for a predetermined time, according to the adjustment of the condenser 115. This affords opportunity for the weld to cool while subjected to the pressure of the fluid in the welder. When the dielectric current, from the condenser 115, ceases to flow through the solenoid 111 of the relay 112, the solenoid 111 is deenergized, and the operation of the relay 112 causes the solenoid 28 to become de-energized by the opening of the circuit of the solenoid 28, through the movable contact 121 of the relay 112, and the valve 24 is closed and the pressure ceases.

The condenser 134, which was charged upon the operation of the relay 127, and its dielectric flow was initiated by the opening of the movable contact 131 of the relay 128, which operates to maintain the flow of the dielectric current to maintain the energization of the solenoid 133 of the relay 108 for a period to cover the weld-cooling time period and the off-time, or pressure release, period. The condenser 134 continues to discharge through the solenoid 133 of the relay 108 to maintain the circuit open through the contact 107 and prevent the flow of the current to the solenoid 111, subsequent to the de-energization of the solenoid 28 and the cessation of pressure of the welder on the work, during which period, the welder 20 may be moved to a succeeding point of the operation and where it is desired to produce a succeeding weld. Upon the cessation of the flow of the dielectric current from the condenser 134, the movable contact 107 is closed, which again causes the solenoid 111 to be energized, assuming that the switch 41 is held closed by the operator. Upon the closure of the contact 107, the condenser 115 becomes charged and the solenoid 111 becomes energized, which causes the operation of the relay 112 to complete the circuit through the solenoid 28, which operates the valve 24 to again produce the pressure in the welder 20. Thus, the cycle of operations repeat themselves as long as the switch 41 is held closed by the operator.

In order to prevent an interruption of the cycle of operation of the control system before the pressure release period occurs, the relay 112, which is held closed by the dielectric current of the condenser 115, is provided with a movable contact 137, which is connected in parallel with the switch 41 to maintain the flow of the current in the parts of the control system until the relay 112 has been operated to open the shunt circuit of the switch 41 by the movable contact 137.

Figure 3:
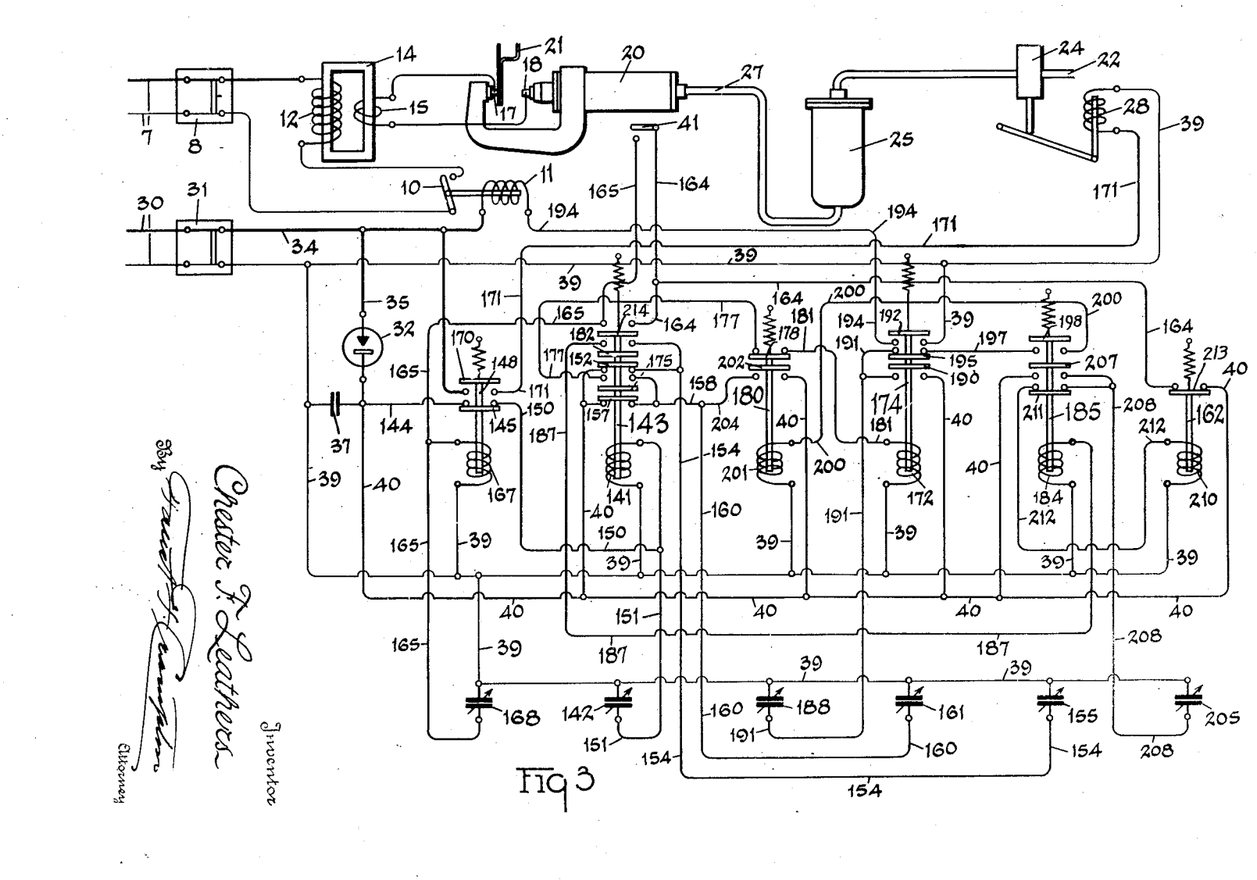
Fig. 3 illustrates, diagrammatically, a welder apparatus and a timer-controlling system for causing the production of a welding pressure for a predetermined interval of time and for causing the flow of a welding current for a plurality of predetermined intervals of time separated by predetermined intervals of time and within the pressure period, the first of the flow periods being initiated at the expiration of a predetermined interval of time subsequent to the initiation of the pressure period, and the last of the intervals of the flow period terminating before the cessation of the pressure period for a predetermined interval of time, the pressure period followed by a predetermined interval of time, during which the work or the welder may be moved, one relative to the other.

In the form of timer-control system illustrated in Fig. 3, the welding current is caused to flow intermittently and during periods of predetermined lengths, to enable the electrodes of the welder to cool. This is for the purpose of preventing the pressure and the heat from mushrooming the welder points, which often occurs where one or both of the parts of the work is formed of relatively thick metal, which requires a considerable heat to raise it to a welding temperature and a considerable pressure to insure contact of the parts of the work with each other. A longer period of flow of the current is required to produce the high temperature, and, although the welding electrodes are artificially cooled by the flow of the liquid through the interior of the electrodes, as is common, the applied heat at the points of the electrodes tends to produce mushrooming of the metal of the electrodes. By producing intermittent flow of the current for controlled periods of time, the electrodes have opportunity to respond to the cooling effects of the liquid without materially reducing the heat of the metal during the cooling periods of the electrodes.

When the main-line switch 31 is closed to connect the timer-control system with the main line 30 the rectifier 32, and its associated condenser 37, is connected to the main lines through the lines 34, 35 and 39 and the rectified potential difference is produced on the lines 39 and 40. The current of the rectifier operates to, simultaneously, energize the solenoid 141 of the relay 143 and to charge the adjustable condenser 142. The solenoid 141 is energized by the circuit from the line 40, through the line 144, the movable contact 145 of the relay 146, the line 150, the solenoid 141, to the line 39. The circuit divides and the current flows through the line 151 to the condenser 142, which is connected to the line 39. In response to the energization of the solenoid 141 of the relay 143, the movable contact 152 is caused to complete a circiut from the line 40, through the line 154, to the condenser 155. The condenser 155 is connected to the line 39, which charges the condensers. Also, the movable contact 157 of the relay 143 completes the circuit from the line 40, through the line 158, the line 160, the condenser 161 which is connected to the line 39, and the condenser 161 is, also, charged.

Upon the operation of the switch 41, by the operator, a circuit is completed from the line 40, through the movable contact 213 of the relay 162, the line 164, to the switch 41 through the line 165, to the solenoid 167 of the relay 146 and the condenser 168, which are connected to the line 39. This produces simultaneous energization of the solenoid 167 and charging of the adjustable condenser 168.

Upon energization of the solenoid 167, the relay 148 operates the movable contact 145 to open the circuit to the solenoid 141 and the condenser 142, which are connected to the line 39. It, also, closes the circuit from the line 34, through the movable contact 170 of the relay 148, to the line 171, to the solenoid 28 of the valve 24 and to the line 39 to cause the operation of the valve 24, which produces the operation of the booster 26 and the welder 20 to cause the welding electrodes 17 and 18 to engage the work 21 for a pressure period.

The circuit of the solenoid 141, having been opened by the movable contact 145 of the relay 148, is now maintained energized by the discharge of the condenser 142, which is connected to the solenoid 141 and, consequently, the dielectric current flows through the solenoid 141 to maintain the relay 143 in the position produced by the flow of the current from the line 40 through the contact 145 of the relay 148. This produces the timed interval, which affords opportunity for the welder to develop its maximum pressure on the work, and insures contact of the parts of the work.

Upon cessation of flow of the dielectric current from the condenser 142, through the solenoid 141 the movable contacts of the relay 143 move upward and the circuit to the condenser 161, which is connected to the line 40, through the movable contact 157 of the relay 143, the line 158, and the line 160, is broken and the condenser 161 is connected to the circuit of the solenoid 172 of the relay 174, through the movable contact 175 of the relay 143, to the line 177, the movable contact 178 of the relay 180, to the line 181 to the solenoid 172 of the relay 174, which is now energized by the dielectric current from the condenser 161, which operates the relay 174, to complete the circuit to the contactor switch 10 from the line 39, through the movable contact 192 of the relay 174, the line 194, the solenoid 11 of the contactor switch 10, to the line 34. The operation of the relay 174 completes a circuit through the solenoid 11 of the contactor switch 10 to cause its operation and produce the flow of the welding current through the electrodes 17 and 18 and the work 21.

The relay 143, also, breaks the connection of the condenser 155 with the line 40 by the movement of the movable contact 152 of the relay 143, and the closure of the movable contact 182 of the relay 143 completes the circuit to the solenoid 184 of the relay 185 and produces the flow of the dielectric current from the condenser 155, through the line 154, the movable contact 182 of the relay 143, to the line 187, through the solenoid 184 of the relay 185, to the line 39, and the dielectric current from the condenser 155, which is connected to the line 39, energizes the solenoid 184 to operate the relay 185. The relay 185 maintains its movable contact 198 closed for a predetermined time to enable the intercontrol of the relays 174 and 180 that cooperate to produce the intermittent flow of the welding current.

The welding current flow is maintained for a period of time, as determined by the adjusted capacity of the condenser 161, during which the solenoid 172 of the relay 174 is energized by the flow of the dielectric current from the condenser 161. When the solenoid 172 of the relay 174 is energized it completes a circuit from the line 40, through the movable contact 199 of the relay 174, to the line 191, to the condenser 188, which is connected to the line 39, to charge the condenser 188.

When the dielectric current from the condenser 161 ceases to flow, the solenoid 172 is de-energized, which interrupts the flow of the current through the solenoid 11 of the contactor switch 10, and the welding current from the secondary 15 discontinues for a period of time, dependent upon the adjusted capacity of the condenser 188.

The condenser 188, which was charged when the solenoid 172 of the relay 174 was energized, is connected by the relay 174 through the line 191, the movable contact 195, the line 197, the movable contact 198, the line 200, to the solenoid 201 of the relay 180, which is connected to the line 39, and the relay 174 is maintained open during the period of discharge of the condenser 188, as determined by its adjustment.

Upon the cessation of flow of the dielectric current of the condenser 188, through the solenoid 201, the relay 180 is again returned to a position, such as to charge the condenser 161. The current flows from the line 40, through the movable contact 202, to the line 204, the line 160, to the condenser 161, which is connected to the line 39. This again charges the condenser 161, which is again discharged upon the de-energization of the solenoid 201 of the relay 180, which occurs upon the cessation of flow of the dielectric current of the condenser 188. Thus, the welding current flows during periods of predetermined length, as determined by the adjusted capacity of the condenser 161, and the periods of flow are separated from each other by intermittent periods, which are determined in their length by the adjusted capacity of the condenser 188, and until the dielectric current of the condenser 155 ceases to flow.

The condenser 155 was charged by the energization of the solenoid 141 of the relay 143 by closure of the main-line switch 31, and its dielectric current was initiated when the solenoid 141 of the relay 143 was deenergized, which disconnected the condenser from the rectifier to initiate the periodic flow of the welding current. Upon the discontinuance of the flow of the dielectric current from the condenser 155, the solenoid 184 of the relay 185 becomes de-energized, which causes the movable contact 198 of the relay 185 to open the circuit of the solenoid 201 of the relay 180, through the line 200, and prevents the operation of the relay 180 to maintain the movable contact 202 in an open position and prevent the charge of the condenser 161 and the closure of the relay 174, and, hence, the intermittent flow of the welder current is discontinued.

When the solenoid 141 of the relay 143 is de-energized to permit the release of its movable contacts 182, the solenoid 184 of the relay 185 is energized to complete the circuit of the condenser 205 through the movable contact 207 of the relay 185, which connects the line 40 with the line 208, to the condenser 205, which is connected to the line 39. Thus, the condenser 205 is charged. Upon the de-energization of the solenoid 184 of the relay 185, the condenser 205 is connected to the solenoid 210, through the movable contact 211, the line 212, to the solenoid 210, which, also, is connected to the line 39, and, thus, the condenser 205 energizes the solenoid 210 to open the circuit of the solenoid 167 of the relay 148 and the condenser 168, through the movable contact 213 of the relay 162, the line 164, the switch 41, and the line 165. When the circuit from the line 40, through the solenoid 167 and the condenser 168, is discontinued by the movable contact 213 of the relay 162, the condenser 168 maintains the solenoid 167 of the relay 148 energized for a predetermined period of time to maintain the solenoid 28 of the valve 24 energized and the pressure of the electrodes on the work, notwithstanding, the discontinuance of the intermittent flow of the welding current. This affords opportunity for the weld to cool and harden.

Upon the discharge of the condenser 168, the movable contact 170 of the relay 148 opens and the solenoid 28 of the valve 24 is de-energized, the valve 24 is closed with reference to the transmission of the pressure to the booster 25, the welder 20 releases the work, and, during a period as determined by the adjustment of the condenser 205, the welder may be moved, with respect to the work, to locate the welder for the production of a succeeding weld.

The condenser 205 discharges through the solenoid 210 of the relay 162 and, upon completion of the discharge of the condenser 205, the movable contact 213 reestablishes the circuit of the solenoid 167 of the relay 148 and the condenser 168, whereupon the cycle of operation begins anew, provided the switch 41 is maintained closed by the operator.

In order to prevent discontinuance of the operation of the welder, during the welding time and the weld-cooling time, the relay 143 is provided with a movable contact 214, which is connected across the lines leading to and from the switch 41, during the time that the solenoid of the relay 143 is de-energized. The movable contact 214, thus, maintains the circuit closed to prevent discontinuance of the welding and weld-cooling operation.

In the timer-control system shown in the figures, a rectifier and a condenser are connected to a source of supply of alternating current. If desired, the condenser may be omitted, which will produce a unidirectional pulsating current. Also, any source of direct current may be used, in place of the rectifier, to charge the condensers. Also, the condensers may have capacities or may be discharged through resistance to produce periods of discharge of desired lengths or the desired periods of discharge of the condensers may be produced by using condensers having certain capacities that discharge through circuits having certain resistances.

The solenoids of the relays, which are energized by the dielectric currents of the condenser of the systems shown in the drawings, have high resistances to reduce the amperage of the dielectric current to enable accurate control of the time periods of flow by adjustment of the capacities of the condensers. The same result may be accomplished by a variable resistance in series with the solenoids, which may be adjusted to vary the amperage of the dielectric currents and, consequently, to vary periods of the discharge. Also, if desired, both the resistance and the condenser, in each case, may be, independently, adjustable to produce a final adjustment that is producible by adjustment of either the condenser or the resistance alone.

I claim:

1. In a timer control system for actuating first and second translating means, the combination of first and second condensers, means for supplying charging current to said first condenser, control means, means including circuit connections responsive to said control means for disconnecting said first condenser from said first means and for directly connecting said first translating means to said first condenser for actuation by the energy stored in said first condenser, means rendered effective by and during the flow of said energy for delivering charging current to said second condenser, and means rendered effective after a predetermined flow of said energy from said first condenser for rendering said second condenser effective to discharge the energy stored therein and actuate said second translating means.

2. In a timer control system, the combination of first and second electro-responsive elements, first and second condensers, means for supplying charging current to said condensers, and control means including circuit connections for rendering said first and second condensers respectively effective to supply discharge current to said first and second electro-responsive elements, means responsive to the discharge current from each said condenser for controlling the discharge circuit connections for the other condenser and for enabling each said condenser to be supplied with charging current from said first-mentioned means during the period that the other condenser is discharging.

3. In a control system for determining successive timing periods, first and second electro-responsive elements operative when actuated to determine at least certain of said periods, first and second condensers, means for supplying charging current to said condensers, control means, means responsive to said control means for interrupting the supplying of charging current to said first condenser and for enabling the energy stored therein to discharge through and actuate said first electro-responsive element so as to determine one of said periods, and means rendered effective at the conclusion of said one period for interrupting the supplying of charging current to said second condenser and for enabling said second condenser to discharge through said second electro-responsive element so as to determine another of said periods.

4. In a timing control system for determining successive timing periods, first and second translating means respectively operative when actuated to control said periods, first and second condensers and means including circuit connections associated therewith for delivering charging current to said condensers, control means operable to interrupt the charging connection for said first condenser and to connect said first translating means to said first condenser for actuation by the energy stored in said first condenser, and control means operated as a consequence of the discharge of energy from said first condenser for interrupting the charging connection to said second condenser and for connecting said second translating means to said second condenser for actuation by the energy stored in said second condenser.

5. In a timing control system for determining successive timing periods, first and second translating means respectively operative when actuated to control said periods, first and second condensers and means including circuit connections associated therewith for delivering charging current to said condensers, control means operable to interrupt the charging connection for said first condenser and to connect said first translating means to said first condenser for actuation by the energy stored in said first condenser, and control means operated by said first translating means for interrupting the charging connection to said second condenser and for connecting said second translating means to said second condenser for actuation by the energy stored in said second condenser.

6. In a timing control system for controlling the connection between a work circuit and a source of power, first and second translating means for controlling said connection, first and second condensers and means including circuit connections associated therewith for delivering charging current to said condensers, control means operable to interrupt the charging connection for said first condenser and to connect said first translating means to said first condenser for actuation by the energy stored in said first condenser, control means operable after said actuation for interrupting the charging connection for said second condenser and for connecting said second translating means to said second condenser for actuation by the energy stored in said second condenser, said first-mentioned control means being operated by said second translating means, and said second-mentioned control means being operated by said first translating means.

7. In a timing control system for controlling a work circuit having active and idle periods, a translating means for controlling the length of certain of said periods, a condenser, means including circuit connections for connecting said condenser to a source of charging current, said circuit connections being normally complete so that said condenser is normally in a charged condition, and control means operable independently of the condition of said condenser to interrupt said charging connections and to connect said translating means to said condenser for actuation by the energy stored therein, said condenser when so connected to said translating means being effective to maintain said translating means actuated for an interval determined by the discharge interval of said condenser to thereby determine the length of said certain of said periods.

8. In a control system for controlling timing periods, a plurality of condensers, means including circuit connections for connecting the condensers to a source to charge the condensers; translating means operated by the discharge current of each of the condensers and operative to control at least certain of said periods, control means for interrupting the charging connections for one of the condensers and initiating a flow of discharge current therefrom, and means operated as a consequence of the flow of said discharge current from said one of the condensers to interrupt the charging connections for another of the condensers and to initiate the flow of discharge current from said last mentioned one of the condensers.

9. In a control system for providing successive timing intervals each of predetermined length, first and second condensers associated respectively with said intervals, means including circuit connections for supplying charging current to said condensers, translating means individual to said condensers and operative when actuated to provide said timing intervals, control means for interrupting the charging connections for the first condenser and connecting the corresponding translating means thereto for actuation by the energy stored therein, said energy maintaining said corresponding translating means actuated for one of said intervals, and means operably responsive to said first translating means at the expiration of said one interval for interrupting the charging connections for the second condenser and for connecting the corresponding translating means thereto for actuation by the energy stored therein, said energy of said second condenser maintaining said last mentioned translating means actuated for another of said intervals.

10. In a timing control system for controlling the connection between a work circuit and a source of power, first and second translating means for controlling said connection, first and second condensers and means including circuit connections associated therewith for delivering charging current to said condensers, control means operable to interrupt the charging connection for said first condenser and to connect said first translating means to said first condenser for actuation by the energy stored in said first condenser, said energy maintaining said first translating means actuated for a first period of predetermined length, control means operable after said actuation for interrupting the charging connection for said second condenser and for connecting said second translating means to said second condenser for actuation by the energy stored in said second condenser, said energy of said second condenser maintaining said second translating means actuated for a second period of predetermined length, said first mentioned control means being operated by said second translating means, and said second-mentioned control means being operated by said first translating means.

11. In a timing control system for controlling the connection between a work circuit and a source of power, first and second translating means operative when actuated to control said connection, first and second condensers and means including circuit connections associated therewith for delivering charging current to said condensers, control means operable to interrupt the charging connection for said first condenser and to connect said first translating means to said first condenser for actuation by the energy stored in said first condenser, said energy maintaining said first translating means actuated for a first period of predetermined length, control means operable after said actuation for interrupting the charging connection for said second condenser and for connecting said second translating means to said second condenser for actuation by the energy stored in said second condenser, said energy of said second condenser maintaining said second translating means actuated for a second period of predetermined length, said first mentioned control means being operated by said second translating means, said second mentioned control means being operated by said first translating means, and additional timing means for determining the length of the period throughout which the condensers are effective to so actuate said translating means.

12. In a timing control system for controlling the connection between a work circuit and a source of power, first and second translating means operative when actuated to control said connection, first and second condensers and means including circuit connections associated therewith for delivering charging current to said condensers, control means operable to interrupt the charging connection for said first condenser and to connect said first translating means to said first condenser for actuation by the energy stored in said first condenser, control means operable after said actuation for interrupting the charging connection for said second condenser and for connecting said second translating means to said second condenser for actuation by the energy stored in said second condenser, said first-mentioned control means being operated by said second translating means, said second mentioned control means being operated by said first translating means, and additional timing means operable to determine an over-all timing interval after the expiration of which said condensers are ineffective to further actuate said translating means.

CHESTER F. LEATHERS.